US012670580B2

(12) United States Patent
Bartl et al.

(10) Patent No.: US 12,670,580 B2
(45) Date of Patent: Jun. 30, 2026

(54) SYSTEMS, APPARATUSES, AND METHODS FOR INSPECTING INNER SURFACES OF HOLES USING PIXEL-INTENSITY ANALYSIS

(71) Applicant: The Boeing Company, Arlington, VA (US)

(72) Inventors: Andreas Bartl, Munich (DE); Seth A. Yakel, Seattle, WA (US); Kwok Tung Chan, Mercer Island, WA (US)

(73) Assignee: The Boeing Company, Arlington, VA (US)

( * ) Notice: Subject to any disclaimer, the term of this patent is extended or adjusted under 35 U.S.C. 154(b) by 401 days.

(21) Appl. No.: 18/337,273

(22) Filed: Jun. 19, 2023

(65) Prior Publication Data

US 2024/0420308 A1      Dec. 19, 2024

(51) Int. Cl.
| | |
|---|---|
| *G06T 7/00* | (2017.01) |
| *G06T 3/40* | (2006.01) |
| *G06T 7/11* | (2017.01) |

(52) U.S. Cl.
CPC .............. *G06T 7/0008* (2013.01); *G06T 3/40* (2013.01); *G06T 7/11* (2017.01); *G06T 2207/20021* (2013.01); *G06T 2207/20221* (2013.01); *G06T 2207/30108* (2013.01)

(58) Field of Classification Search
CPC . G06T 7/0008; G06T 3/40; G06T 7/11; G06T 2207/20021; G06T 2207/20221; G06T 2207/30108; G06T 2207/10068; G06T 2207/30164; G01B 11/0616
See application file for complete search history.

(56) References Cited

U.S. PATENT DOCUMENTS

| | | | |
|---|---|---|---|
| 9,292,726 | B2 | 3/2016 | Thorsted |
| 10,275,858 | B2 | 4/2019 | Turner |
| 10,334,209 | B2 | 6/2019 | Fu |
| 10,373,360 | B2 | 8/2019 | Gorur Sheshagiri |
| 10,783,683 | B2 | 9/2020 | Pettersson |
| 10,970,578 | B2 | 4/2021 | Moore |
| 11,137,014 | B2 | 10/2021 | Hansen |
| 2006/0195014 | A1* | 8/2006 | Seibel ................... A61B 1/0008 |
| | | | 600/102 |
| 2011/0080588 | A1* | 4/2011 | Segall .................. G01N 21/954 |
| | | | 356/445 |
| 2014/0004255 | A1* | 1/2014 | Whitbeck ................. C23C 4/12 |
| | | | 427/8 |
| 2017/0161886 | A1* | 6/2017 | Shibayama ............ G01N 21/88 |
| 2018/0003474 | A1* | 1/2018 | Aufschläger .......... G01B 11/14 |
| 2020/0378749 | A1* | 12/2020 | Ono ..................... G01N 21/954 |
| 2022/0058788 | A1 | 2/2022 | Yu |
| 2023/0123664 | A1 | 4/2023 | Liu |
| 2024/0240864 | A1* | 7/2024 | Israelsen ................. F27D 19/00 |

* cited by examiner

*Primary Examiner* — Hwa Andrew Lee
(74) *Attorney, Agent, or Firm* — Walters & Wasylyna LLC

(57) ABSTRACT

An inspection system includes a scanner and a computing device. The scanner is configured to scan an inner surface of a hole in an object. The scanner is configured to generate a plurality of images. Each one of the images represents one of a plurality of sections of the inner surface of the hole. The computing device is coupled to the scanner to receive the plurality of images. The computing device is programmed to combine the plurality of images to form an image. The image represents the inner surface of the hole. The computing device is programmed to evaluate a surface characteristic of the inner surface based on pixel-intensity values of the image.

20 Claims, 7 Drawing Sheets

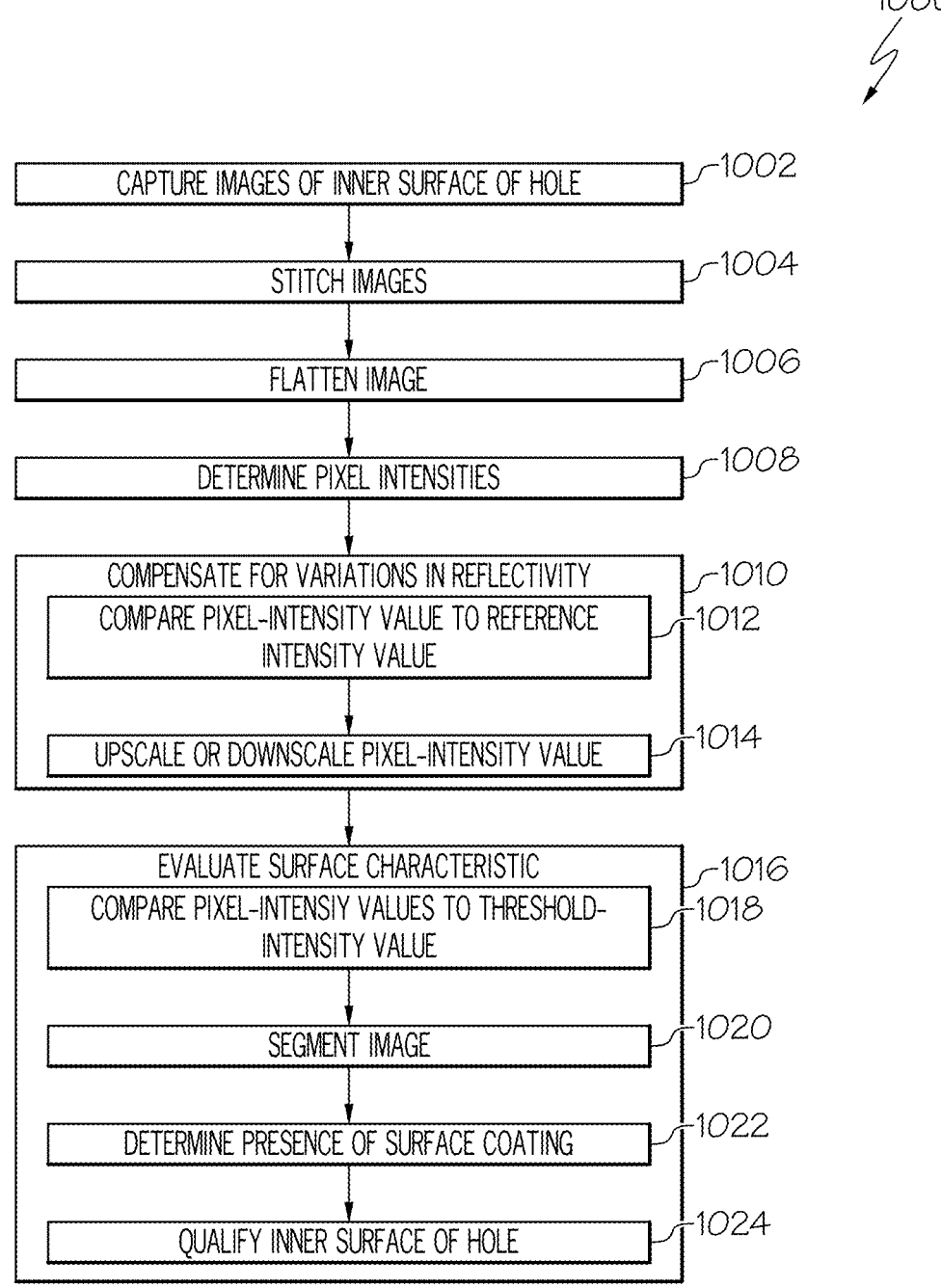

*1000*

| CAPTURE IMAGES OF INNER SURFACE OF HOLE | 1002 |

| STITCH IMAGES | 1004 |

| FLATTEN IMAGE | 1006 |

| DETERMINE PIXEL INTENSITIES | 1008 |

COMPENSATE FOR VARIATIONS IN REFLECTIVITY — 1010

COMPARE PIXEL-INTENSITY VALUE TO REFERENCE INTENSITY VALUE — 1012

UPSCALE OR DOWNSCALE PIXEL-INTENSITY VALUE — 1014

EVALUATE SURFACE CHARACTERISTIC — 1016

COMPARE PIXEL-INTENSIY VALUES TO THRESHOLD-INTENSITY VALUE — 1018

SEGMENT IMAGE — 1020

DETERMINE PRESENCE OF SURFACE COATING — 1022

QUALIFY INNER SURFACE OF HOLE — 1024

SPECIFICATION AND DESIGN ⟋1102

MATERIAL PROCUREMENT ⟋1104

COMPONENT AND SUBASSEMBLY MFG. ⟋1106

SYSTEM INTEGRATION ⟋1108

CERTIFICATION AND DELIVERY ⟋1110

IN SERVICE ⟋1112

MAINTENANCE AND SERVICE ⟋1114

1200

AIRCRAFT

SYSTEMS    1204

1202 AIRFRAME    1208 PROPULSION    ELECTRICAL 1210

1206 INTERIOR    HYDRAULIC    ENVIRONMENTAL 1214

1212

SYSTEMS, APPARATUSES, AND METHODS FOR INSPECTING INNER SURFACES OF HOLES USING PIXEL-INTENSITY ANALYSIS

FIELD

The present disclosure relates generally to hole inspection and, more particularly, to systems and methods for inspecting and evaluating inner surfaces of holes in objects.

BACKGROUND

Many manufacturing operations routinely include inspection of manufactured products, for example, as quality control measures. As an example, many manufactured products require inspection of inner surfaces of holes formed in the products. Conventional techniques of performing hole inspection typically involve the use of a camera to capture images of the inner surface of the hole. However, conventional inspection techniques are limited in the type of surface evaluations that can be performed. As an example, conventional techniques are not suitable for properly evaluating coatings disposed on the inner surface of the hole. Accordingly, those skilled in the art continue with research and development efforts in the field of hole inspection.

SUMMARY

Disclosed are examples of an inspection system, an inspection method, a data processing system, a computer program product, and a computer-readable storage media. The following is a non-exhaustive list of examples, which may or may not be claimed, of the subject matter according to the present disclosure.

In an example, the disclosed inspection system includes a scanner and a computing device. The scanner is configured to scan an inner surface of a hole in an object. The scanner is configured to generate a plurality of images. Each one of the images represents one of a plurality of sections of the inner surface of the hole. The computing device is coupled to the scanner to receive the plurality of images. The computing device is programmed to combine the plurality of images to form a stitched image. The stitched image represents the inner surface of the hole. The computing device is programmed to evaluate a surface characteristic of the inner surface based on pixel-intensity values of the stitched image.

In an example, the disclosed inspection method includes steps of: (1) capturing a plurality of images of an inner surface of a hole in an object; (2) combining the images to form a stitched image that represents the inner surface of the hole; and (3) evaluating a surface characteristic of the inner surface based on pixel-intensity values of the stitched image.

In an example, the disclosed data processing system includes a processor and a memory storing program code that, when executed by the processor, causes the processor to: (1) receive a plurality of images that represent a plurality of sections of an inner surface of a hole in an object 200; (2) combine the images to form a stitched image that represents the inner surface of the hole; and (3) evaluate a surface characteristic of the inner surface based on pixel-intensity values of the stitched image.

In an example, the disclosed computer program product includes instructions that, when executed by a computing device, cause the computing device to carry out one or more steps of: (1) receiving a plurality of images that represent a plurality of sections of an inner surface of a hole in an object;

(2) combining the images to form a stitched image that represents the inner surface of the hole; and (3) evaluating a surface characteristic of the inner surface based on pixel-intensity values of the stitched image.

In an example, the disclosed computer-readable storage media includes instructions that, when executed by a computing device, cause the computing device to carry out one or more steps of: (1) receiving a plurality of images that represent a plurality of sections of an inner surface of a hole in an object; (2) combining the images to form a stitched image that represents the inner surface of the hole; and (3) evaluating a surface characteristic of the inner surface based on pixel-intensity values of the stitched image.

Other examples of the inspection system, the inspection method, the data processing system, the computer program product, and the computer-readable storage media disclosed herein will become apparent from the following detailed description, the accompanying drawings, and the appended claims.

BRIEF DESCRIPTION OF THE DRAWINGS

FIG. 9 is a flow diagram of an example of an inspection method;

DETAILED DESCRIPTION

Figure 6:
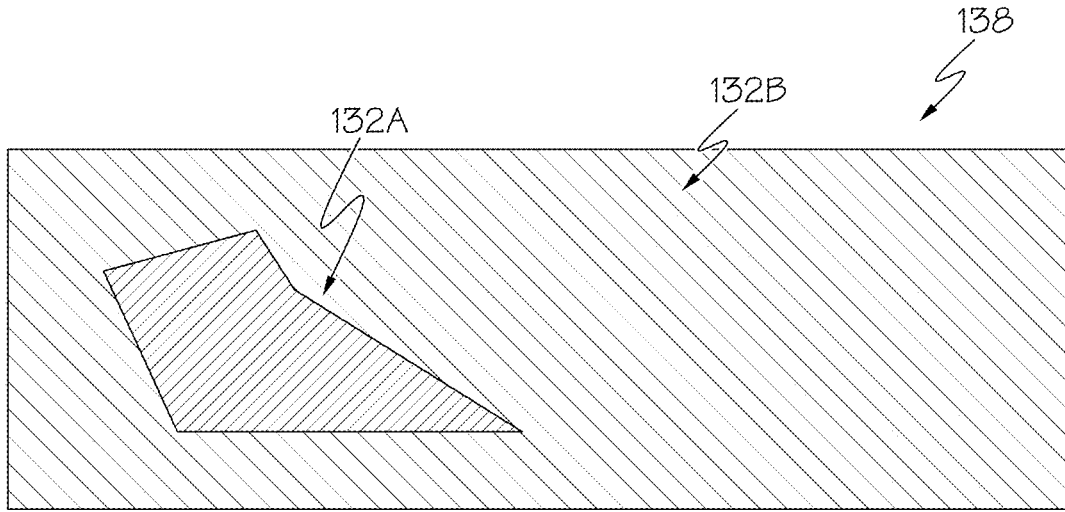
FIG. 6 is a schematic illustration of an example of a segmented image formed from the flattened image and representing the inner surface of the hole.
Figure 7:
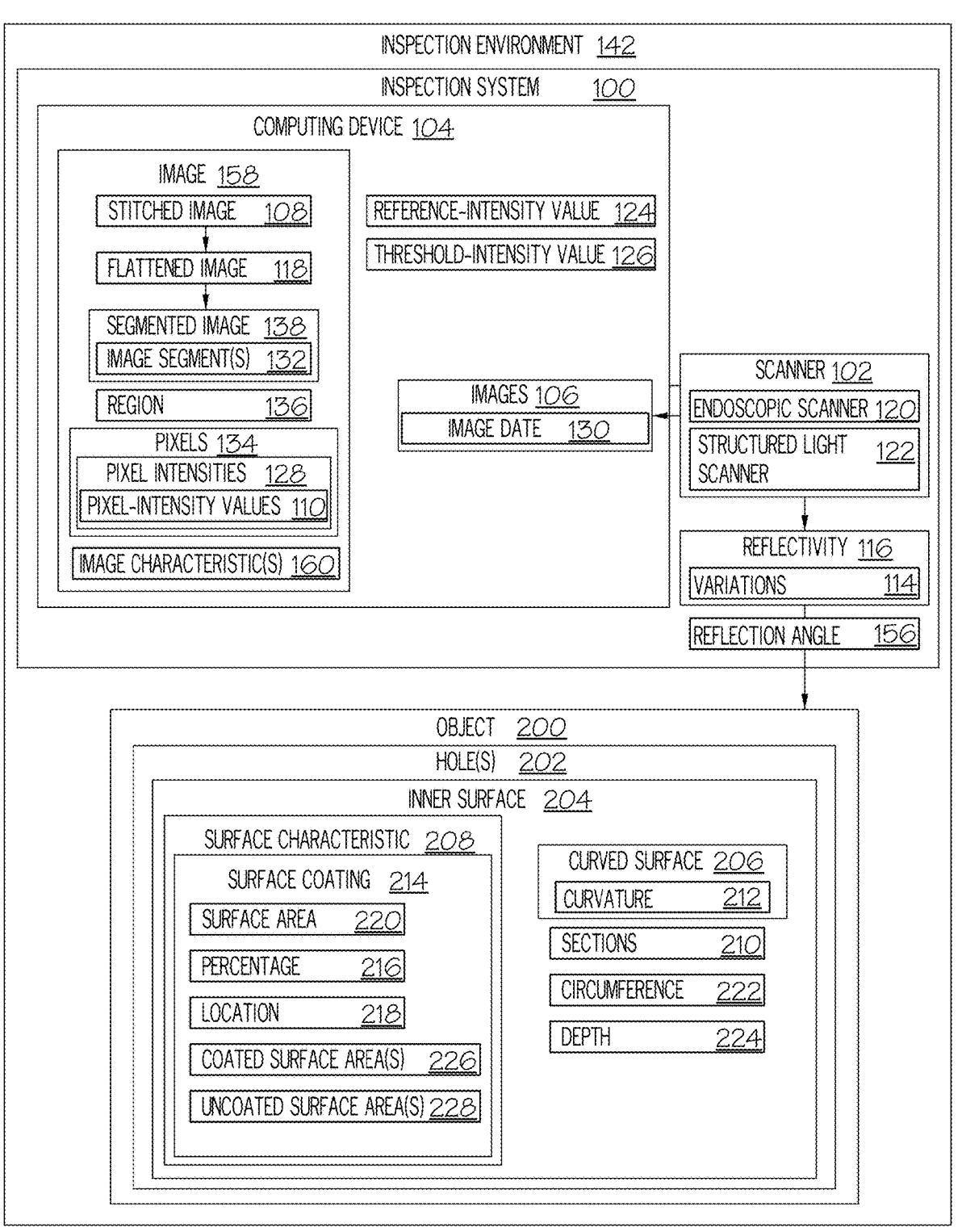
FIG. 7 is a schematic block diagram of an inspection environment.
Figure 8:
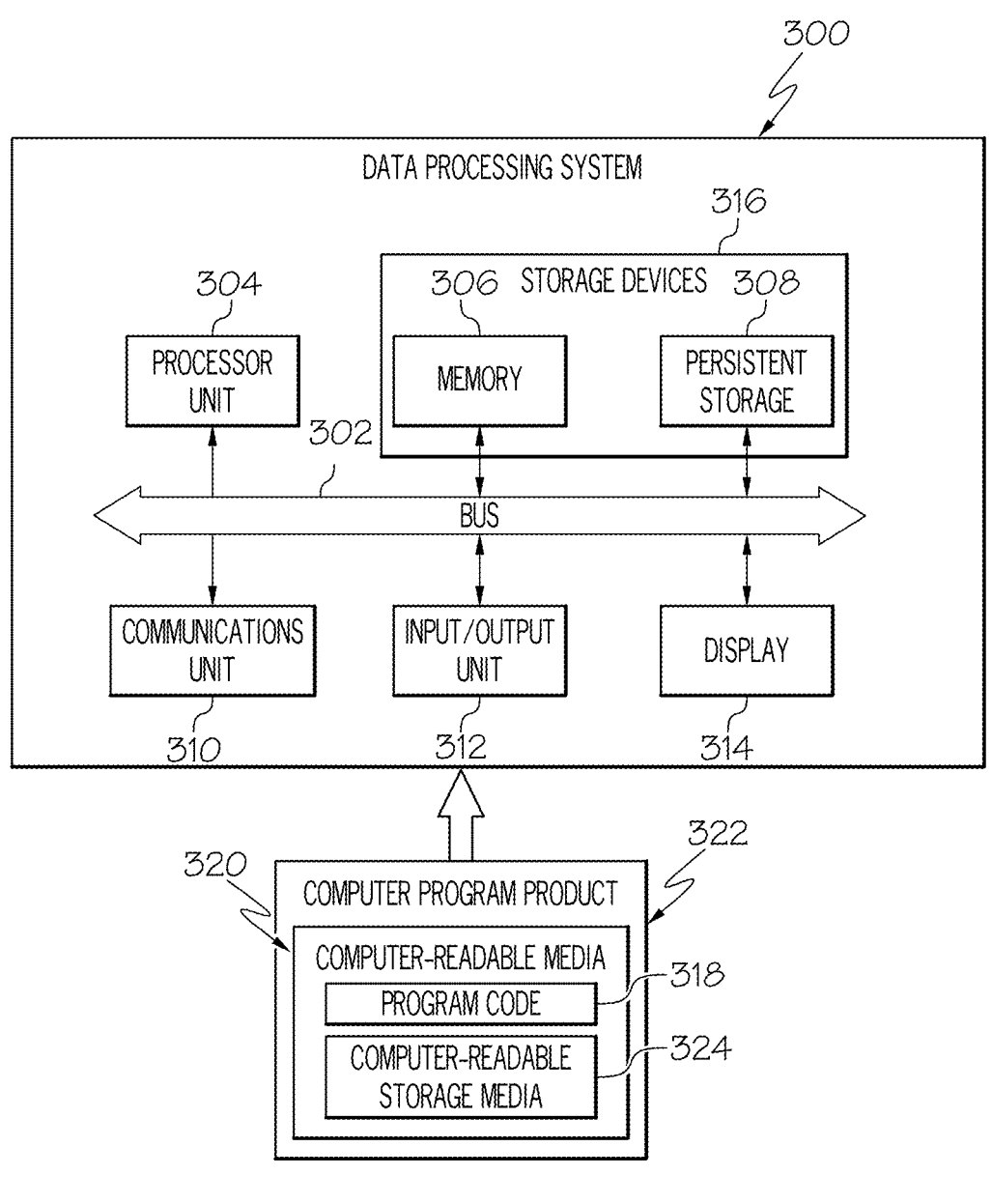
FIG. 8 is a schematic block diagram of an example of the data processing system.

Referring generally to FIGS. 1-9, by way of examples, the present disclosure is directed to a system for inspecting inner surfaces of holes (referred to herein as an inspection system 100) and a method for inspecting inner surfaces of holes (referred to herein as an inspection method 1000). Referring particularly to FIG. 8, by way of examples, the present disclosure is also directed to a data processing system 300, a computer program product 322, and a computer-readable storage media 324, for example, as used by the inspection system 100 (FIG. 7) and/or to implement the inspection method 1000 (FIG. 9).

Many manufactured products include one or more holes formed (e.g., drilled or otherwise machined) in the product. Many of such manufactured products also include one or more types of surface coatings. Depending on the type and/or purpose of the surface coating, the surface coating is either intentionally applied on an inner surface of a hole formed in the product or unintentionally applied on the inner surface of the hole. As an example, in aerospace manufacturing, conductive gap filler (CGF) coatings are often applied within holes as electro-magnetic effect (EME) protection, for example, against lightning strikes. However, consistent application of such coatings within the hole is challenging. As another example, primer coatings are often applied to outer surfaces of aerospace components after drilling the holes. However, unintentional overspray of such coatings within the holes can have a negative impact on the EME performance and/or can cause fatigue knockdown. Accordingly, the ability to evaluate an inner surface of a hole, such as whether the inner surface includes a surface coating, is highly desirable and beneficial.

However, inspection of the inner surfaces of holes is currently limited to visual inspection methods that provide only qualitative assessment of the hole surface. Examples of the inspection system 100 and the inspection method 1000 disclosed herein provide unique improvements in hole inspection techniques that enable quantitative assessment of the hole surface. In preferred implementations, the inspection system 100 and the inspection method 1000 enable automated inspection of borehole coatings by utilizing an endoscopic hole-scanning device and one or more computer-implemented image-processing algorithms. As an example, a hole surface is scanned and images of different parts of the hole surface are generated. Effects on reflection represented in the images due to hole curvature are subsequently compensated. The images are then combined. The resulting image is subsequently segmented into coated areas and uncoated surface areas based on pixel intensities within the image, which represent reflectivity of the hole surface. The hole surface is then assessed, for example, based on a percentage of the hole surface having the coating.

Figure 4:
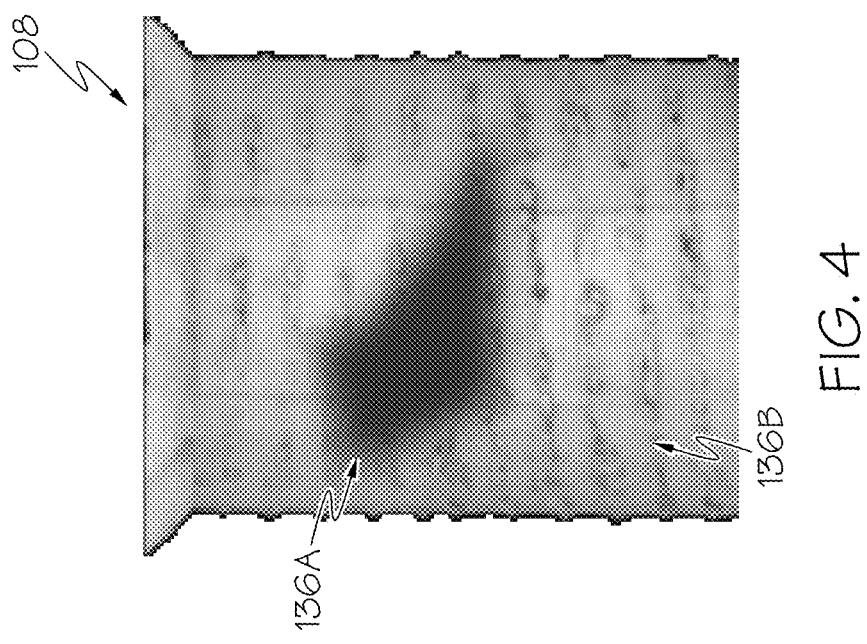
FIG. 4 is a schematic illustration of an example of a stitched image formed from the plurality of images and representing the inner surface of the hole.
Figure 5:
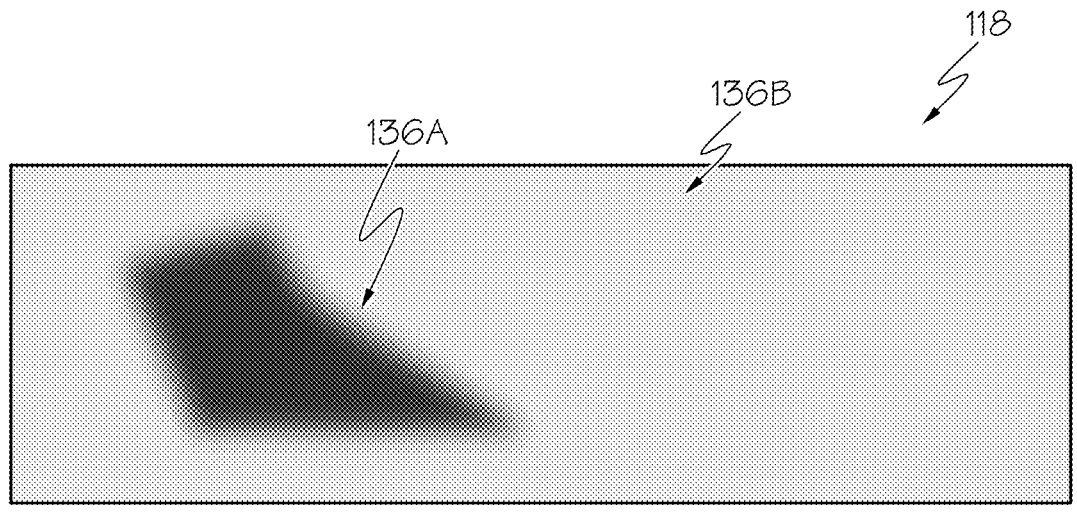
FIG. 5 is a schematic illustration of an example of a flattened image formed from the stitched image and representing the inner surface of the hole.

Referring now to FIGS. 1-6, in one or more examples, the inspection system 100 includes a scanner 102 and a computing device 104. The scanner 102 generates a plurality of images 106 (FIG. 3) of an inner surface 204 (e.g., the hole surface) of a hole 202 in an object 200. Each one of the images 106 covers a different portion of the inner surface 204 and, thereby, represents areas or sections 210 of the inner surface 204 that are covered by different reflection angles 156 due to a curvature 212 of the inner surface 204 of the hole 202. One or more programmed processes or algorithms are executed by the computing device 104 that compensates for reflectivity 116 of the different areas of the inner surface 204 based on the reflection angle 156. One or more programmed processes or algorithms are executed by the computing device 104 that combine ("stitch") the images 106 together to form a stitched image 108 (FIG. 4). The stitched image 108 is a single, full image that represents at least a portion of a surface area of the inner surface 204, such as an entirety of the surface area of the inner surface 204, in three-dimensional space. Optionally, one or more programmed processes or algorithms are subsequently executed by the computing device 104 that flatten the stitched image 108 to form a flattened image 118 (FIG. 5). The flattened image 118 is a single, full image that represents at least a portion of the full surface area of the inner surface 204, such as an entirety of the surface area of the inner surface 204, in two-dimensional space. Subsequently, one or more programmed processes or algorithms are executed by the computing device 104 that segment an image 158 (e.g., the stitched image 108 or the flattened image 118) to form a segmented image 138 (FIG. 6) that includes or represents one or more coated surface areas and/or one or more uncoated surface areas, for example, based on pixel intensities 128 or other image characteristics 160 represented in different regions 136 of the image 158. Subsequently, one or more programmed processes or algorithms are executed by the computing device 104 that assesses the inner surface 204 based on the coated surface areas and/or uncoated surface areas.

It can be appreciated that one or more of image processing operations executed by the computing device 104 to evaluate the inner surface 204 of the hole 202 can be performed on the stitched image 108 or on the flattened image 118. As such, throughout the present disclosure, reference to the image 158 refers to either the stitched image 108, the flattened image 118, or a segmented image 118. As such, while the example of the segmented image 138 illustrated in FIG. 6 is a two-dimensional image or representation of the inner surface 204 formed from the flattened image 118, in other examples, the segmented image 138 is a three-dimensional image or representation of the inner surface 204 formed from the stitched image 108. As such, in some examples, a pixel in three-dimensional space can be referred to as a voxel having voxel-intensity values representing voxel intensities of the voxels. The present disclosure recognizes that one or more of the image processing operations executed by the computing device 104 can be more efficient and/or accurate when performed on a two-dimensional image (e.g., the flattened image 118), rather than a three-dimensional image (e.g., the stitched image 108). As such, in one or more examples, it may be advantageous to convert the stitched image 108 into the flattened image 118 for image processing.

In one or more examples, the inspection system 100 is implemented as a portable or handheld device in which the scanning operation of the inspection and evaluation process is performed manually, for example, by an operator or technician, or as part of a quality spot check. Alternatively, in one or more examples, the inspection system 100 is implemented as an automated end effector in which the scanning operation of the inspection and evaluation process is performed automatically, for example, by a programmed robot or gantry platform, or as part of process quality control.

In one or more examples, the object 200 includes or takes the form of any suitable type of manufactured product, article, structure, part, or component, such as an aerospace component. The object 200 can be made of any suitable material, such as metals, metal alloys, composites (e.g., fiber-reinforced polymer composites), and combinations thereof. The hole 202 can have any suitable dimensions (e.g., diameter and depth). The hole 202 can be formed by any suitable machining technique, such as drilling using a rotary cutting tool. In one or more examples, the hole 202 is formed in the object 200 as part of a full-size determinant assembly (FSDA) operation. In one or more examples, presence of the surface coating 214 on the inner surface 204 of the hole 202 is intended and, therefore, desired. As an example, the surface coating 214 is an electro-magnetic effect (EME) protective coating, such as a conductive gap filler (CGF) coating. In one or more examples, presence of the surface coating 214 on the inner surface 204 of the hole 202 is unintended and, therefore, undesirable. As an example, the surface coating 214 is a primer coating intended for exterior surfaces of the object 200.

Figure 1:
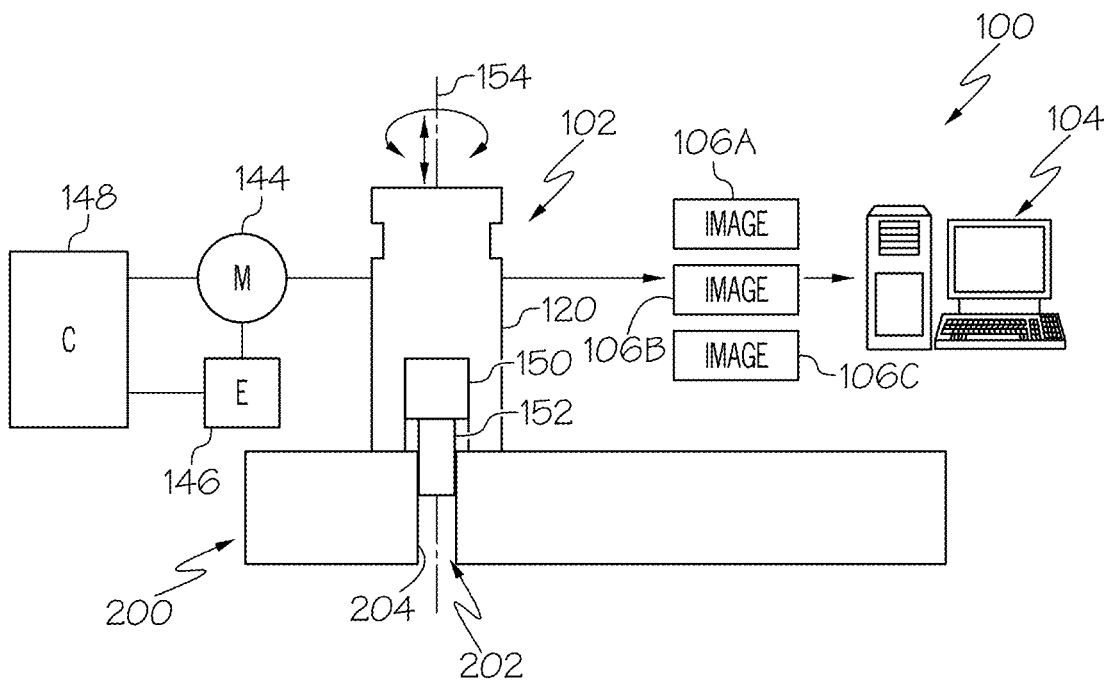
FIG. 1 is a schematic, elevation view of an example of a scanner positioned in a hole in an object.

FIG. 1 schematically illustrates an example of the inspection system 100 used to inspect and evaluate the inner surface 204 of the hole 202. The inspection system 100 includes the scanner 102 and the computing device 104. The computing device 104 is coupled to or is otherwise in communication with the scanner 102.

In one or more examples, the scanner 102 scans the inner surface 204 of the hole 202 in the object 200. At least a portion of the scanner 102 is inserted into or is otherwise received by the hole 202. The scanner 102 generates a plurality of images 106. As an example, the scanner 102 generates image data 130 (FIG. 7). The image data 130 is used to generate or create the images 106. As such, in different implementations, the images 106 can be generated by the scanner 102, by the computing device 104, or a combination of the two using the image data 130. As an example, the image data 130 or the images 106 are transmitted by the scanner 102 and are received by the computing device 104.

In one or more examples, each one of the images 106 (e.g., a portion of the image data 130) represents a portion of the inner surface 204 of the hole 202. As an example, each one of the images 106 (e.g., a data set of the image data 130) represents a corresponding one of a plurality of sections 210 (FIG. 7) of the inner surface 204. As an example, the images 106, in total, represent an entirety of the inner surface 204 of the hole 202.

In one or more examples, the scanner 102 is linearly movable along a scan axis 154 relative to the hole 202. As an example, the scanner 102 is linearly movable along the scan axis 154 for insertion within and removal from the hole 202 and for selectively locating the scanner 102 relative to a depth of the hole 202. As an example, the scanner 102 is linearly movable along the scan axis 154 for scanning (e.g., generating the image data 130 or capturing the images 106) different portions of the inner surface 204 in a depth dimension of the hole 202 (e.g., parallel to the scan axis 154).

In one or more examples, the scanner 102 is rotationally movable about the scan axis 154 relative to the hole 202. As an example, the scanner 102 is rotationally movable about the scan axis 154 for selectively angularly orienting the scanner 102 relative to a circumference of the hole 202. As an example, the scanner 102 is rotationally movable about the scan axis 154 for scanning (e.g., generating the image data 130 or capturing the images 106) different portions of the inner surface 204 along the circumference of the hole 202 (e.g., concentric to the scan axis 154).

In one or more examples, the inspection system 100, such as the scanner 102, includes a number of operational components, such as, but not limited to, a motor 144, an encoder 146, a controller 148, a camera 150, and optics 152. The motor 144 is configured to drive at least one of linear motion of the scanner 102 along the scan axis 154 and/or rotational motion of the scanner 102 about the scan axis 154. The encoder 146 is coupled to the motor 144 and is configured to detect rotation angle and/or linear displacement such that the location and/or angular orientation of the scanner 102 in space can be tracked and/or determined, for example, relative to the object 200 or some other fixed coordinate system. The controller 148 is coupled to or is otherwise in communication with the motor 144 and/or the encoder 146 and is configured to instruct or otherwise command operation of the motor 144 to drive motion of the scanner 102. The camera 150 includes or takes the form of any suitable image sensor or image capture device. In one or more examples, the camera 150 also includes a projector that is configured to project or otherwise direct light (e.g., laser light, structured light, etc.) onto the inner surface 204 of the hole 202 such that the image sensor captures reflections of the projected light. The optics 152 include any suitable optical module, lens assembly, and the like.

Figure 2:
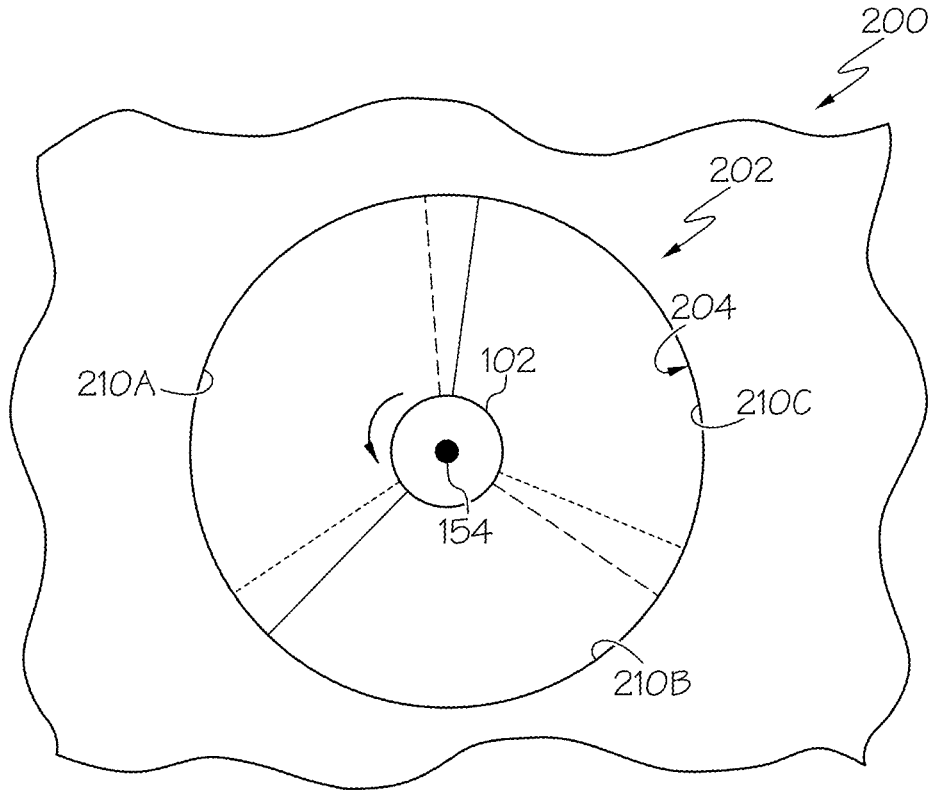
FIG. 2 is a schematic, plan view of an example of the scanner scanning an inner surface of the hole.

FIG. 2 schematically illustrates an example of the scanner 102 positioned within the hole 202 and scanning the inner surface 204. During scanning, the scanner 102 is located along the scan axis 154 (FIG. 1) within the hole 202. At a given location along and angular orientation about the scan axis 154, a field of view (FOV) of the scanner 102 covers one of the sections 210 of the inner surface 204, including a portion of a circumference 222 and at least a portion of a depth 224 (FIG. 7) of the hole 202. As an example, each one of the images 106 (e.g., a first image 106A, a second image 106B, a third image 106C, etc. in FIG. 1) represents a corresponding one of the sections 210 (e.g., a first section 210A, a second section 210B, a third section 210C, etc. in FIG. 2). The scanner 102 can have any suitable field of view. The number the sections 210 of the inner surface 204 scanned and, thus, the number of the images 106 generated after one revolution of the scanner 102 about the scan axis 154 depends on the field of view of the scanner 102 and the dimensions of the hole 202.

In one or more examples, the scanner 102 includes or takes the form of a suitable endoscopic scanning device, such as an endoscopic scanner 120. The endoscopic scanner 120 generates the image data 130 and/or the images 106 by rotating and axially moving the field of view over the inner surface 204 of the hole 202. Each one of the images 106 covers different reflection angles 156 due to the curvature 212 of the hole 202. The inner surface 204 of the hole 202 includes any curved surface 206, such as a circumferential surface.

Generally, the field of view is configured such that any two directly adjacent ones of the images 106 overlap or include a common portion of a given one of the sections 210. As an example, the first image 106A represents the first section 210A of the inner surface 204. At least a portion (e.g., an edge or end portion) of the second image 106B overlaps the first image 106A and includes a portion (e.g., an edge or end portion) of the first section 210A. The second image 106B represents the portion of the first section 210A and the second section 210B of the inner surface 204. At least a portion (e.g., an edge or end portion) of the third image 106C overlaps the second image 106B and includes a portion (e.g., an edge or end portion) of the second section 210B. This overlapping configuration of the images 106 is repeated for all of the sections 210 of the inner surface 204.

In one or more examples, dependency of the reflectivity 116 on the reflection angle 156 is compensated using the computing device 104. As an example, one or more programmed processes or algorithms are executed by the computing device 104 that compensate for variations in the reflectivity 116 based on the reflection angle 156 due to the curvature 212 of the inner surface 204 of the hole 202 are compensated by comparing the pixel-intensity values 110 represented in the image 158 to a reference-intensity value 124. The reference-intensity value 124 is an estimated, calculated, measured, or known intensity value of an image pixel corresponding to a known reflectivity of a known surface at a known reflection angle. One or more programmed processes or algorithms are then executed by the computing device 104 that upscale or downscale one or more of the pixel-intensity values 110 represented in the image 158 based on the reference-intensity value 124 and the reflection angle 156 (or incidence angle) of the scanner 102 and the inner surface 204 of the hole 202.

Figure 3:
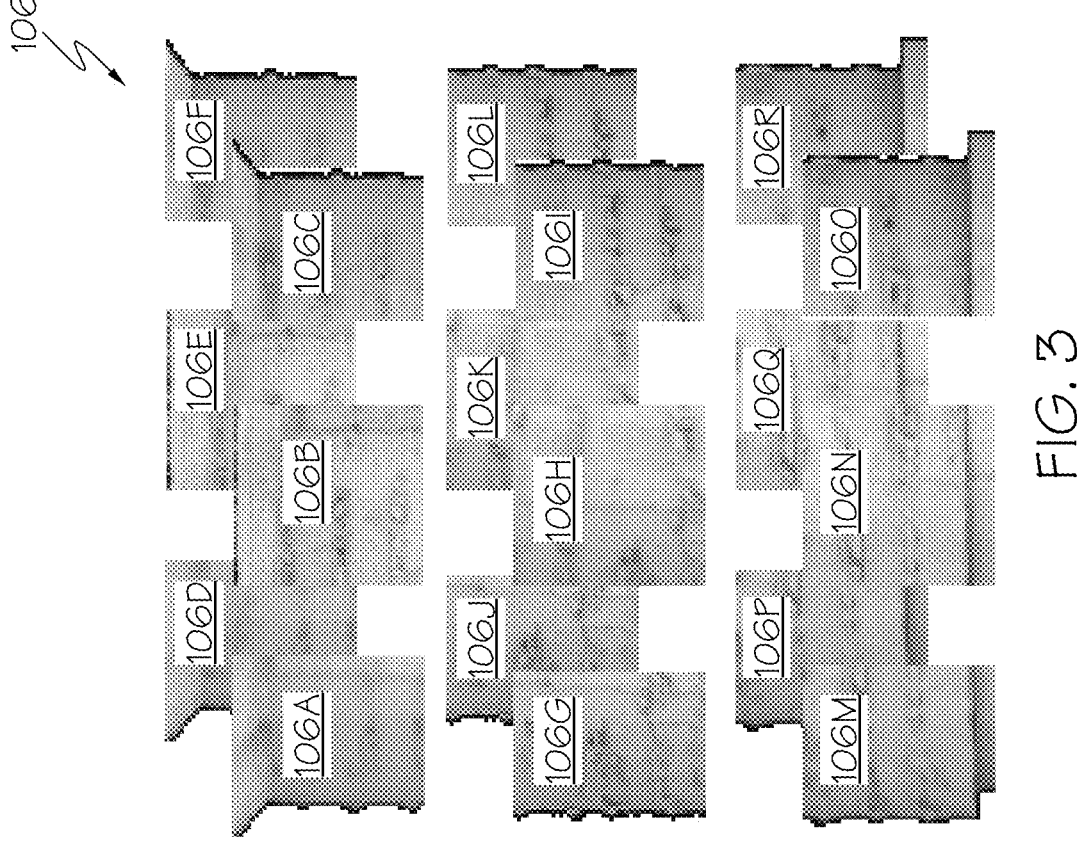
FIG. 3 is a schematic illustration of an example of a plurality of images captured by the scanner of the inner surface of the hole.

FIG. 3 schematically illustrates an example of a plurality of the images 106 as captured by the scanner 102. The images 106 correspond to the sections 210 of the inner surface 204 of the hole 202. The scanner 102 generates or captures any number of the images 106 needed to adequately represent the sections 210 of the inner surface 204 of the hole 202, for example, based on the field of view of the scanner 102, the dimensions of the hole 202, and the surface area of the inner surface 204 to be evaluated.

In the illustrative example, images 106A-106F represent corresponding sections of a full circumference of a first (e.g., upper) portion of the inner surface 204 of the hole 202. Images 106G-106L represent corresponding sections of a full circumference of a second (e.g., central) portion of the inner surface 204 of the hole 202. Images 106M-106R represent corresponding sections of a full circumference of a third (e.g., lower) portion of the inner surface 204 of the hole 202.

Each one of the images 106 includes or is formed by a plurality of pixels 134. A pixel refers to a single scalar element of a digital image or a single data point of image data captured by the scanner 102. For example, each of the image 106 is divided into multiple pixels 134 (e.g., equally sized units). Each one of the pixels 134 in the image 106 represents a discrete area and has an associated pixel-intensity value 110 (FIG. 7).

FIG. 4 schematically illustrates an example of the stitched image 108 that is generated from the plurality of the images 106 (e.g., shown in FIG. 3). In one or more examples, the stitched image 108 represents a significant portion, such as an entirety of, the inner surface 204 of the hole 202. The stitched image 108 is a three-dimensional image, such as a 3D point cloud image. The stitched image 108 is generated by combining or stitching the images 106 together. The computing device 104 generates the stitched image 108 from the images 106 using any one or more of various image processing techniques, known to those skilled in the art, for combining or stitching images together.

Like the images 106, the stitched image 108 includes or is formed by a plurality of the pixels 134. For example, the stitched image 108 is divided into the pixels 134 (e.g., equally sized units). Each one of the pixels 134 in the stitched image 108 represents a discrete area and has an associated pixel-intensity value 110 (FIG. 7). As in the illustrative grayscale example, lower values of pixel intensities appear relatively dark (e.g., black) and higher values of pixel intensities appear relatively light (e.g., white). Accordingly, the pixel-intensity values 110 can be used to estimate or otherwise represent the reflectivity 116 of the inner surface 204 of the hole 202. As an example, lower instances of the pixel-intensity values 110 (e.g., of a first region 136A of the stitched image 108) represent lesser reflectivity 116 of the inner surface 204 and higher instances of the pixel-intensity values 110 (e.g., of a second region 136B of the stitched image 108) represent greater reflectivity 116.

FIG. 5 schematically illustrates an example of the flattened image 118 that is generated from the stitched image 108 (e.g., shown in FIG. 4). In one or more examples, the flattened image 118 represents a significant portion, such as an entirety of, the inner surface 204 of the hole 202. The flattened image 118 is a two-dimensional image, such as a 2D point cloud image. The flattened image 118 is generated by flattening or "unrolling" the cylindrical stitched image 108. The computing device 104 generates the flattened image 118 from the stitched image 108 using any one or more of various image processing techniques known to those skilled in the art for transforming 3D images into 2D images.

Like the stitched image 108, the flattened image 118 includes or is formed by the plurality of the pixels 134. For example, the flattened image 118 is divided into the pixels 134 (e.g., equally sized units). Each one of the pixels 134 in the flattened image 118 represents a discrete area and has an associated pixel-intensity value 110 (FIG. 7). As in the illustrative grayscale example, lower values of pixel intensities appear relatively dark (e.g., black) and higher values of pixel intensities appear relatively light (e.g., white). Accordingly, the pixel-intensity values 110 can be used to estimate or otherwise represent the reflectivity 116 of the inner surface 204 of the hole 202. Generally, the regions 136 of different pixel intensities 128 of the stitched image 108 are transformed to corresponding regions 136 of different pixel intensities 128 of the flattened image 118. As in the illustrative example, the lower pixel-intensity values 110 (e.g., of the first region 136A of the stitched image 108) represent the lesser reflectivity 116 of the inner surface 204 and the higher pixel-intensity values 110 (e.g., of the second region 136B of the stitched image 108) represent the greater reflectivity 116.

FIG. 6 schematically illustrates an example of the segmented image 138 that is generated from the flattened image 118 (FIG. 5). In one or more examples, the segmented image 138 represents a significant portion, such as an entirety of, the inner surface 204 of the hole 202. The segmented image 138 is a two-dimensional image representing similarities in the pixel intensities 128 of proximate ones or clusters of the pixels 134. The segmented image 138 is generated by segmenting the different regions 136 of the flattened image 118 into corresponding image segments 132. The computing device 104 generates the segmented image 138 from the flattened image 118 using any one or more of various image processing techniques, known to those skilled in the art, for image segmentation.

The segmented image 138 includes or is formed by the plurality of the pixels 134. For example, the segmented image 138 is divided into the pixels 134 (e.g., equally sized units). Each one of the pixels 134 in the segmented image 138 represents a discrete area and has an associated pixel-intensity value 110 (FIG. 7). Each one of the image segments 132 represents or includes a group, a set, or a cluster of the pixels 134 having substantially the same pixel-intensity values 110 or otherwise sharing some characteristics. As in the illustrative example, a first image segment 132A represents the first region 136A and includes a first set of the pixels 134 having approximately the same pixel-intensity values 110 (e.g., lower pixel-intensity values) and a second image segment 132B represents the second region 136B and includes a second set of the pixels 134 having approximately the same pixel-intensity values 110 (e.g., higher pixel-intensity values).

The computing device 104 can utilize any suitable image segmentation process or algorithm to generate the segmented image 138 and/or define one or more of the image segments 132 including a cluster of the pixels 134 having similar characteristics (e.g., pixel-intensity values 110), such as sematic segmentation, instance segmentation, panoptic segmentation, and the like. In one or more examples, the computing device 104 implements or executes a thresholding method configured to o turn a gray-scale image (e.g., the flattened image 118 in FIG. 5) into a binary image (e.g., the segmented image 138 in FIG. 6). As an example, the thresholding method selects a threshold value (or values when multiple thresholding levels are selected). Examples of the thresholding method include, but are not limited to, maximum entropy method, balanced histogram thresholding, Otsu's method (maximum variance), k-means clustering, and the like. Additionally, the thresholding method can use multi-dimensional fuzzy rule-based non-linear thresholds. In these examples, decisions over each pixel's membership to a segment are based on multi-dimensional rules derived from fuzzy logic and evolutionary algorithms based on image lighting environment and application.

Referring now to FIGS. 1-7, in one or more examples, at least a portion of the scanner 102, such as the endoscopic scanner 120, is inserted in the hole 202 and is rotated about and/or linear moved along the scan axis 154 to generate the images 106. The images 106 (e.g., the image data 130) are transmitted from the scanner 102 and received by the computing device 104, for example, over a wired connection or a wireless connection. The computing device 104 stitches, or combines, the images 106 to form the stitched image 108. The stitched image 108 represents the inner surface 204 of the hole 202 as a three-dimensional image. The computing device 104 flattens the stitched image 108 to form the flattened image 118. The flattened image 118 represents the inner surface 204 of the hole 202 as a two-dimensional image. The computing device 104 segments the flattened image 118 to form the segmented image 138. The pixels 134 are clustered or grouped into the image segments 132, for example, using a threshold method on the pixel-intensity values 110 or using another image characteristic 160 (e.g., image textures) that represent the surface characteristic 208 of the inner surface 204, such as whether the inner surface 204 is coated or uncoated.

In one or more examples, the computing device 104 evaluates the surface characteristic 208 of the inner surface 204 based on the scans provided by the scanner 102. In these examples, the different ones of the image segments 132, represented in the segmented image 138 and including clusters of the pixels 134 having similar pixel-intensity values 110 or other similar image characteristics 160, correspond to or otherwise quantitatively represent surface areas 220 of the inner surface 204 of the hole 202 having different magnitudes of reflectivity 116.

In one or more examples, the computing device 104 evaluates the surface characteristic 208 of the inner surface 204 based on the plurality of the pixel intensities 128 of the plurality of the pixels 134. In one or more examples, the surface characteristic 208 is the existence of the surface coating 214, which is disposed or otherwise applied on the inner surface 204 of the hole 202. The pixel intensities 128 are quantified by pixel-intensity values 110. The pixel-intensity values 110 represent the reflectivity 116 of different areas on the inner surface 204 corresponding to or otherwise quantitatively representing coated surface areas 226 and/or uncoated surface areas 228. The computing device 104 assesses coverage of the inner surface 204. As an example, coverage of the inner surface 204 is assessed using a ratio between a number of the pixels 134 having lower pixel-intensity values 110 (e.g., representing lower reflectivity 116 and/or uncoated surface areas 228) and a number of the pixels 134 having higher pixel-intensity values 110 (e.g., representing higher reflectivity 116 and/or coated surface areas 226). As an example, coverage of the inner surface 204 is assessed using a ratio between an area of the image segments 132 having the pixels 134 with lower pixel-intensity values 110 (e.g., representing lower reflectivity 116 and/or uncoated surface areas 228) and an area of the image segments 132 having the pixels 134 with higher pixel-intensity values 110 (e.g., representing higher reflectivity 116 and/or coated surface areas 226). Other quantitative evaluation criteria based on the pixel-intensity values 110 and/or the other image characteristics 160 are also contemplated, as recognized by those skilled in the art.

In one or more examples, certain operations described herein as being performed by the inspection system 100 and/or according to the inspection method 1000, such as various data-processing operations used to analyze image data and evaluate surface characteristics represented by the image data, are performed using the computing device 104. In one or more examples, the computing device 104 includes one or more computers, controllers, or combinations thereof. In one or more examples, the computing device 104 serves as an inspection and evaluating environment and is programmed to perform various operations of the inspection system 100 and/or the inspection method 1000. In one or more examples, the computing device 104 executes one or more software programs or applications. In one or more examples, the computing device 104 includes or takes the form of a data processing system 300 (FIG. 8) that includes a processor 304 and a memory 306 having one or more instances of program code 318 stored thereon. Accordingly, for the purpose of the present disclosure, general reference to the computing device 104 may, in some examples, refer to the data processing system 300, components of the data processing system 300, or instructions (e.g., data-processing modules and/or program code applications) that are implemented or executed by the data processing system 300.

Referring generally to FIGS. 1-6 and particularly to FIG. 7. In one or more examples, the inspection system 100 operates in an inspection environment 142 to inspect inner surfaces of holes in objects. The following are examples of the inspection system 100, according to the present disclosure. Not all of the elements, features, and/or components described in one example are required in that example. Some or all of the elements, features, and/or components described in one example can be combined with other examples in various ways without the need to include other elements, features, and/or components described in those other examples, even though such combination or combinations are not explicitly described or illustrated by example herein.

In one or more examples, the inspection system 100 includes the scanner 102 and the computing device 104. The scanner 102 is adapted or configured to scan (e.g., scans) the inner surface 204 of the hole 202 in the object 200. The scanner 102 is adapted or configured to generate (e.g., generates) the plurality of images 106. Each one of the images 106 represents one of the plurality of sections 210 of the inner surface 204. The computing device 104 is coupled to the scanner 102. The computing device 104 is adapted or programed to receive (e.g., receives) the plurality of images 106.

In one or more examples, the computing device 104 is adapted or programmed to combine (e.g., combines) the plurality of images 106 to form the stitched image 108. The stitched image 108 represents the inner surface 204 of the hole 202. In one or more examples, the images 106 are combined into one full image of the inner surface 204 of the hole 202 to form the stitched image 108. Any suitable image processing technique as known to one skilled in the art can be used to combine the images 106 to form the stitched image 108. In one or more examples, overlapping portions or image features located in overlapping portions of adjacent ones of the images 106 are combined. Overlapping image features can be used to identify the exact relative positions of the images 106.

In one or more examples, the computing device 104 is adapted or programmed to flatten the stitched image 108 to form the flattened image 118. The flattened image 118 represents the inner surface 204 of the hole 202. Flattening the stitched image 108 to form the flattened image 118 improves efficiency and reduces complexity in image processing operations used to evaluate the inner surface 204 using the pixel intensities 128. Any suitable image processing technique as known to one skilled in the art can be used to flatten the stitched image 108 to form the flattened image 118. In one or more examples, the stitched image 108 is unrolled using a cylindrical coordinate system to flatten the stitched image 108 into the flattened image 118.

In one or more examples, the computing device 104 is adapted or programmed to compensate (e.g., compensates) for the variations 114 in the reflectivity 116 of the inner surface 204 due to the curvature 212 of the inner surface 204. In one or more examples, the computing device 104 is adapted or programmed to compare (e.g., compares) the pixel-intensity values 110 represented in the image 158 (e.g., the stitched image 108 or the flattened image 118) to the reference-intensity value 124. The computing device 104 is adapted or programmed to upscale or downscale (e.g., upscales or downscales) one or more of the pixel-intensity values 110 represented in the image 158 (e.g., the stitched image 108 or the flattened image 118) based on the reference-intensity value 124 and the reflection angle 156 (e.g., incidence angle) of the scanner 102 and the inner surface 204 of the hole 202. Upscaling or downscaling one or more of the pixel-intensity values 110 represented in the image 158 based on the reference-intensity value 124 and the reflection angle 156 compensates for the variations 114, or deviations, in the reflectivity 116 based on the reflection angle 156 due to the curvature 212 of the inner surface 204 of the hole 202.

In one or more examples, the reflectivity compensation can be performed on the plurality of images 106 before combining into the stitched image 108, after combining to form the stitched image 108, before flattening into the flattened image 118, or after flattening to form the flattened image 118.

In one or more examples, the computing device 104 is adapted or programmed to segment (e.g., segments) the image 158 (e.g., the stitched image 108 of the flattened image 118) into the plurality of image segments 132 (e.g., the segmented image 138) based on similarities of the pixel-intensity values 110 of the pixels 134 in one or more of the regions 136 of the image 158 (e.g., the stitched image 108 or the flattened image 118). Any suitable image processing technique as known to one skilled in the art can be used to segment the image 158 into one or more of the image segments 132 based on similarities of the pixel-intensity values 110 of the pixels 134. In one or more examples, the segmentation process is performed on the flattened image 118 to improve processing efficiency and reduce processing complexity.

In one or more examples, the computing device 104 is adapted or programmed to evaluate (e.g., evaluates) the surface characteristic 208 of the inner surface 204 based on the pixel-intensity values 110 of the image 158 (e.g., the stitched image 108 or the flattened image 118), such as of the segmented image 138. In one or more examples, the computing device 104 is adapted or programmed to compare (e.g., compares) the pixel-intensity values 110 to the threshold-intensity value 126. In these examples, the surface characteristic 208 is evaluated based on the comparison of the pixel-intensity values 110 to the threshold-intensity value 126.

In one or more examples, the threshold-intensity value 126 is an intensity value of the pixels 134 in the image 158 that defines or represents a difference in the surface characteristic 208 of the inner surface 204 being evaluated. As an example, the pixels 134 having the pixel-intensity values 110 above the threshold-intensity value 126 may represent a first instance or quantification of the surface characteristic 208, such as being a coated portion of the inner surface 204 that has a higher instance of the reflectivity 116. As another example, the pixels 134 having the pixel-intensity values 110 below the threshold-intensity value 126 may represent a second instance or quantification of the surface characteristic 208, such as being an uncoated portion of the inner surface 204 that has a lower instance of the reflectivity 116.

In one or more examples, the surface characteristic 208 includes, takes the form of, or represents the surface coating 214 that is applied or otherwise disposed on the inner surface 204 of the hole 202. The computing device 104 is adapted or programmed to determine (e.g., determines) the presence of the surface coating 214 based on the comparison of the pixel-intensity values 110 to the threshold-intensity value 126. The computing device 104 is adapted to programmed to qualify (e.g., qualifies) the inner surface 204 based on the presence of the surface coating 214.

In one or more examples, the computing device 104 is adapted or programmed to determine (e.g., determines) the percentage 216 of the inner surface 204 that includes (e.g., is covered by) the surface coating 214. In one or more examples, the percentage 216 of surface coverage is represented by a ratio of the coated surface area 226 to the uncoated surface area 228. In one or more examples, the percentage 216 of surface coverage is represented by a ratio between the number of the pixels 134 in one or more of the image segments 132 representing the coated portions of the inner surface 204 and the number of the pixels 134 on one or more of the image segments 132 representing the uncoated portions of the inner surface 204.

In one or more examples, the computing device 104 is adapted or programmed to determine (e.g., determines) the surface area 220 of the coated portions of the inner surface 204 and/or the surface area 220 of the uncoated portions of the inner surface 204. In one or more examples, white light interferometry is used, and intensity data is linked to corresponding position data such that dimension and surface area can be computed.

In one or more examples, the computing device 104 is adapted or programmed to determine (e.g., determines) the location 218 of the coated portions of the inner surface 204 and/or the location 218 of the uncoated portions of the inner surface 204. In one or more examples, white light interferometry is used, and intensity data is linked to corresponding position data such that location and surface area can be computed.

In one or more examples, the scanner 102 includes or takes the form of the endoscopic scanner 120. The endoscopic scanner 120 is adapted or configured to be inserted within the hole 202. In one or more examples, the scanner 102 includes or takes the form of the structured light scanner 122. In one or more examples, the scanner 102 includes or takes the form of a while light interferometry scanner that is capable of capturing the three-dimensional topology of the inner surface 204 of the hole 202, intensity data representing the reflectivity 116 of the inner surface 204 using the pixel intensities 128, positional data representing the location of the pixels 134, and the like.

Referring now generally to FIGS. 1-8 and particularly to FIG. 9, which schematically illustrates an example of the inspection method 1000. In one or more examples, the inspection method 1000 is implemented using the inspection system 100 (FIG. 1) and/or the data processing system 300 (FIG. 8). In one or more examples, one or more operations or steps of the inspection method 1000 are performed using a computer and, as such, in these examples, the inspection method 1000 is a computer-implemented method or process. The following are examples of the inspection method 1000, according to the present disclosure. Not all of the elements, steps, and/or operations described in one example are required in that example. Some or all of the elements, steps, and/or operations described in one example can be combined with other examples in various ways without the need to include other elements, steps, and/or operations described in those other examples, even though such combination or combinations are not explicitly described or illustrated by example herein.

In one or more examples, the inspection method 1000 includes a step of (block 1002) capturing or generating the plurality of images 106 of the inner surface 204 of the hole 202 in the object 200. The images 106 represent the sections 210 of the inner surface 204. The pixel intensities 128 (e.g., the pixel-intensity values 110) of the pixels 134 in the images 106 represent the reflectivity 116 of the inner surface 204. In one or more examples, the images 106, or the image data 130, are captured or generated using the scanner 102.

In one or more examples, the inspection method 1000 includes a step of (block 1004) combining or stitching the images 106 to form the stitched image 108 that represents the inner surface 204 of the hole 202. Combining the images 106 to form the stitched image 108 provides a full image representation of the inner surface 204 of the hole 202 for further surface evaluation. In one or more examples, combining the images 106 is performed using the computing device 104.

In one or more examples, the inspection method 1000 includes a step of (block 1006) flattening the stitched image 108 to form the flattened image 118 that represents the inner surface 204 of the hole 202. Flattening the stitched image 108 to form the flattened image 118 facilitates more efficient and less complex image processing. In one or more examples, flattening the stitched image 108 is performed using the computing device 104.

In one or more examples, the inspection method 1000 includes a step of (block 1008) determining (e.g., calculating or estimating) the pixel intensities 128 of the pixels 134 represented in the images 106, the stitched image 108, or the flattened image 118 (e.g., the image 158). The pixel intensities 128 are represented or quantified by the pixel-intensity values 110 of the pixels 134 represented in each one of the images 106, the stitched image 108, or the flattened image 118. In one or more examples, determining the pixel intensities 128 is performed using the computing device 104.

In one or more examples, the inspection method 1000 includes a step of (block 1010) compensating for the variations 114 in the reflectivity 116 of the inner surface 204 due to the curvature 212 of the inner surface 204. Compensating for the variations 114 in the reflectivity 116 removes the dependency of the pixel-intensity values 110 on the reflection angle 156 and, thereby, enables the pixels 134 having similarities (e.g., having the pixel-intensity values 110 within a predetermined range) to be grouped or clustered for surface evaluation. In one or more examples, compensating for the variations 114 in the reflectivity 116 is performed using the computing device 104.

In one or more examples, the step of (block 1010) compensating for the variations 114 is performed before or after the step of (block 1004) stitching the images 106. In one or more examples, the step of (block 1010) compensating for the variations 114 is performed before or after the step of (block 1006) flattening the stitched image 108. In one or more examples, the step of (block 1010) compensating for the variations 114 is performed before or after the step of (block 1008) determining the pixel intensities 128.

In one or more examples, the inspection method 1000, such as the step of (block 1010) compensating for the variations 114, includes a step of (block 1012) comparing the pixel-intensity values 110 represented in the images 106, the stitched image 108, or the flattened image 118 (e.g., the image 158) to the reference-intensity value 124. The inspection method 1000, such as the step of (block 1010) compensating for the variations 114, also includes a step of (block 1014) upscaling or downscaling one or more of the pixel-intensity values 110 represented in the images 106, the stitched image 108, or the flattened image 118 (e.g., the image 158) based on the reference-intensity value 124 and the reflection angle 156 of the scanner 102 and the inner surface 204 of the hole 202.

In one or more examples, the inspection method 1000 includes a step of (block 1016) evaluating the surface characteristic 208 of the inner surface 204 based on the pixel-intensity values 110 of the stitched image 108 or the flattened image 118 (e.g., the image 158). Evaluating the surface characteristic 208 of the inner surface 204 based on the pixel-intensity values 110 enables quantitative assessment of the inner surface 204. In one or more examples, evaluating the surface characteristic 208 is performed using the computing device 104.

In one or more examples, the inspection method 1000, such as the step of (block 1016) evaluating the surface characteristic 208, includes a step of (block 1018) comparing the pixel-intensity values 110 to the threshold-intensity value 126. In one or more examples, the inspection method 1000, such as the step of (block 1016) evaluating the surface characteristic 208, the includes a step of (block 1020) segmenting the stitched image 108 or the flattened image 118 (e.g., the image 158) to form the segmented image 138 having the plurality of image segments 132. The image 158 (e.g., the stitched image 108 or the flattened image 118) is segmented based on similarities of the pixel-intensity values 110 of the pixels 134 in the region 136 of the stitched image 108. Segmenting the image 158 based on similarities of the pixel-intensity values 110 of the pixels 134 or another image characteristic 160 enables grouping or clustering of the pixels 134 representing different characteristics of different portions or areas of the inner surface 204. In one or more examples, segmenting the image 158 is performed using the computing device 104.

In one or more examples, the surface characteristic 208 includes or represents the surface coating 214 on the inner surface 204 of the hole 202. The inspection method 1000, such as the step of (block 1016) evaluating the surface characteristic 208, includes a step of (block 1022) determining the presence of the surface coating 214 based on the comparison of the pixel-intensity values 110 to the threshold-intensity value 126. The inspection method 1000, such as the step of (block 1016) evaluating the surface characteristic 208, includes a step of (block 1024) qualifying the inner surface 204 based on the presence of the surface coating 214.

In one or more examples, the inspection method 1000, such as the step of (block 1016) evaluating the surface characteristic 208, includes a step of determining the percentage 216 of the inner surface 204 that includes or is coated by the surface coating 214.

In one or more examples, the inspection method 1000, such as the step of (block 1016) evaluating the surface characteristic 208, includes a step of determining the location 218 of the inner surface 204 that includes or is coated by the surface coating 214.

In one or more examples, the inspection method 1000, such as the step of (block 1016) evaluating the surface characteristic 208, includes a step of determining the surface area 220 of the inner surface 204 that includes or is coated by the surface coating 214.

Referring generally to FIGS. 1-7 and particularly to FIG. 8, which schematically illustrates an example of the data processing system 300 that operates to inspect and/or evaluate inner surfaces of holes in objects. For example, the data processing system 300 can be used to implement the computing device 104 (FIG. 7) or other computer-implemented components of the inspection system 100. The following are examples of the data processing system 300, according to the present disclosure. Not all of the elements, features, and/or components described in one example are required in that example. Some of the elements, features, and/or components described in one example can be combined with other examples in various ways without the need to include other elements, features, and/or components described in those other examples, even though such combination or combinations are not explicitly described or illustrated by example herein.

In one or more examples, the data processing system 300 includes a processor 304, a memory 306, and at least one program code 318. The memory 306 stores the program code 318. When executed by the processor 304, the program code 318 causes the processor 304 to receive the plurality of images 106 that represent the plurality of sections 210 of the inner surface 204 of the hole 202 in the object 200.

In one or more examples, when executed by the processor 304, the program code 318 causes the processor 304 to combine the images 106 to form the stitched image 108 that represents the inner surface 204 of the hole 202.

In one or more examples, when executed by the processor 304, the program code 318 causes the processor 304 to flatten the stitched image 108 to form the flattened image 118 that represents the inner surface 204 of the hole 202.

In one or more examples, when executed by the processor 304, the program code 318 causes the processor 304 to determine (e.g., calculate or estimate) the pixel-intensity values 110 of the pixels 134 represented in the each one of the images 106, the stitched image 108, or the flattened image 118.

In one or more examples, when executed by the processor 304, the program code 318 causes the processor 304 to compensate for the variations 114 in the reflectivity 116 of the inner surface 204 due to the curvature 212 of the inner surface 204.

In one or more examples, when executed by the processor 304, the program code 318 causes the processor 304 to evaluate the surface characteristic 208 of the inner surface 204 based on the pixel-intensity values 110 of the stitched image 108.

In one or more examples, when executed by the processor 304, the program code 318 causes the processor 304 to compare the pixel-intensity values 110 represented in the images 106, the stitched image 108, or the flattened image 118 to the reference-intensity value 124. In one or more examples, when executed by the processor 304, the program code 318 causes the processor 304 to upscale or downscale one or more of the pixel-intensity values 110 represented in the images 106, the stitched image 108, or the flattened image 118 based on the reference-intensity value 124 and the reflection angle 156 of the scanner 102 and the inner surface 204 of the hole 202.

In one or more examples, when executed by the processor 304, the program code 318 causes the processor 304 to compare the pixel-intensity values 110 to the threshold-intensity value 126. In these examples, the surface characteristic 208 is evaluated based on the comparison of the pixel-intensity values 110 to the threshold-intensity value 126.

In one or more examples, the surface characteristic 208 includes or represents the surface coating 214 applied or otherwise disposed on the inner surface 204 of the hole 202. In these examples, when executed by the processor 304, the program code 318 causes the processor 304 to determine the presence of the surface coating 214 based on the comparison of the pixel-intensity values 110 to the threshold-intensity value 126. When executed by the processor 304, the program code 318 further causes the processor 304 to qualify the inner surface 204 based on the presence of the surface coating 214.

In one or more examples, when executed by the processor 304, the program code 318 causes the processor 304 to determine (e.g., calculate or estimate) the percentage 216 of the inner surface 204 that comprises the surface coating 214.

In one or more examples, when executed by the processor 304, the program code 318 causes the processor 304 to determine (e.g., calculate or estimate) the location 218 of the inner surface 204 that includes the surface coating 214.

In one or more examples, when executed by the processor 304, the program code 318 causes the processor 304 to determine (e.g., calculate or estimate) the surface area 220 of the inner surface 204 that includes the surface coating 214.

In one or more examples, when executed by the processor 304, the program code 318 causes the processor 304 to segment the stitched image 108 or the flattened image 118 into the plurality of image segments 132 based on similarities of the pixel-intensity values 110 of the pixels 134 in the region 136 of the stitched image 108.

Referring now to FIG. 8, in one or more examples, the data processing system 300 includes a communications framework 302, which provides communications between the processor 304, storage devices 316, a communications unit 310, an input/output unit 312, and a display 314. In some cases, the communications framework 302 is implemented as a bus system.

In one or more examples, the processor 304 is configured to execute instructions for software to perform a number of operations. The processor 304 includes at least one of a number of processor units, a multi-processor core, or some other type of processor, depending on the implementation. In some examples, the processor 304 takes the form of a hardware unit, such as a circuit system, an application specific integrated circuit (ASIC), a programmable logic device, or some other suitable type of hardware unit.

In one or more examples, instructions for the operating system, applications, and programs run by the processor 304 are located in the storage devices 316. The storage devices 316 are in communication with the processor 304 through the communications framework 302. As used herein, a storage device, also referred to as a computer-readable storage device, is any piece of hardware capable of storing information on a temporary basis, a permanent basis, or both. This information may include, but is not limited to, data, program code, other information, or some combination thereof.

The memory 306 and a persistent storage 308 are examples of the storage devices 316. In one or more examples, the memory 306 takes the form of, for example, a random-access memory or some type of volatile or non-volatile storage device. In one or more examples, the persistent storage 308 includes any number of components or devices. For example, the persistent storage 308 includes a hard drive, a flash memory, a rewritable optical disk, a rewritable magnetic tape, or some combination of the above. The media used by the persistent storage 308 may or may not be removable.

The communications unit 310 allows the data processing system 300 to communicate with other data processing systems, other computer-implemented devices, or both, such as the scanner 102. The communications unit 310 may provide communications using physical communications links, wireless communications links, or both.

The input/output unit 312 allows input to be received from and output to be sent to other devices connected to the data processing system 300. As an example, the input/output unit 312 enables user input to be received, for example, through a keyboard, a mouse, some other type of input device, or a combination thereof connected to the data processing system 300. As another example, the input/output unit 312 enables output to be sent, for example, to a printer or the display 314 connected to the data processing system 300.

The display 314 is configured to display information to a user. The display 314 may include, for example, without limitation, a monitor, a touch screen, a laser display, a holographic display, a virtual display device, some other type of display device, or a combination thereof.

In this illustrative example, the processes of the different illustrative embodiments are performed by the processor 304 using computer-implemented instructions. These instructions are referred to as program code, computer-usable program code, or computer-readable program code and are read and/or executed by the processor 304.

In these examples, the program code 318 is located in a functional form on computer-readable media 320, which is selectively removable, and may be loaded onto or transferred to the data processing system 300 for execution by the processor 304. The program code 318 and the computer-readable media 320 together form a computer program product 322. In the illustrative example, the computer-readable media 320 is a computer-readable storage media 324 or a computer-readable signal media.

In one or more examples, the computer-readable storage media 324 is a physical or tangible storage device used to store the program code 318 rather than a medium that propagates or transmits the program code 318. The computer-readable storage media 324 is, for example, without limitation, an optical or magnetic disk or a persistent storage device that is connected to the data processing system 300.

Alternatively, the program code 318 can be transferred to the data processing system 300 using the computer-readable signal media. The computer-readable signal media can be, for example, a propagated data signal containing the program code 318. This data signal may be an electromagnetic signal, an optical signal, or some other type of signal that can be transmitted over physical communications links, wireless communications links, or both.

The illustration of the data processing system 300 in FIG. 8 is not meant to provide architectural limitations to the manner in which the illustrative embodiments may be implemented. The different illustrative examples may be implemented in a data processing system that includes components in addition to or in place of those illustrated for the data processing system 300. Further, components shown in FIG. 8 may be varied from the illustrative examples shown.

By way of examples, the present disclosure is also directed to the computer program product 322. The computer program product 322 includes instructions (e.g., program code 318) read and executed by the computing device 104. When executed by the computing device 104, instructions cause the computing device 104 to perform at least some of the operations or steps associated with the inspection method 1000. In one or more examples, when executed by the computing device 104, the instructions cause the computing device 104 to carry out one or more steps of: (1) receiving the plurality of images 106 that represent the plurality of sections 210 of the inner surface 204 of the hole 202 in the object 200; (2) combining the images 106 to form the stitched image 108 that represents the inner surface 204 of the hole 202; (3) flattening the stitched image 108 to form a flattened image 118 that represents the inner surface 204 of the hole 202; (4) determining the pixel-intensity values 110 of the images 106, the stitched image 108, or the flattened image 118; (5) compensating for the variations 114 in the reflectivity 116 of the inner surface 204 due to the curvature 212 of the inner surface 204; and (6) evaluating the surface characteristic 208 of the inner surface 204 based on the pixel-intensity values 110 of the stitched image 108.

By way of examples, the present disclosure is further directed to the computer-readable storage media 324. The computer-readable storage media 324 includes instructions (e.g., program code 318) executed by the computing device 104. When executed by the computing device 104, the instructions cause the computing device 104 to perform at least some of the operations or steps associated with the inspection method 1000. In one or more examples, when executed by the computing device 104, the instructions cause the computing device 104 to carry out one or more steps of: (1) receiving the plurality of images 106 that represent the plurality of sections 210 of the inner surface 204 of the hole 202 in the object 200; (2) combining the images 106 to form the stitched image 108 that represents the inner surface 204 of the hole 202; (3) flattening the stitched image 108 to form a flattened image 118 that represents the inner surface 204 of the hole 202; (4) determining the pixel-intensity values 110 of the images 106, the stitched image 108, or the flattened image 118; (5) compensating for the variations 114 in the reflectivity 116 of the inner surface 204 due to the curvature 212 of the inner surface 204; and (6) evaluating the surface characteristic 208 of the inner surface 204 based on the pixel-intensity values 110 of the stitched image 108.

Figure 10:
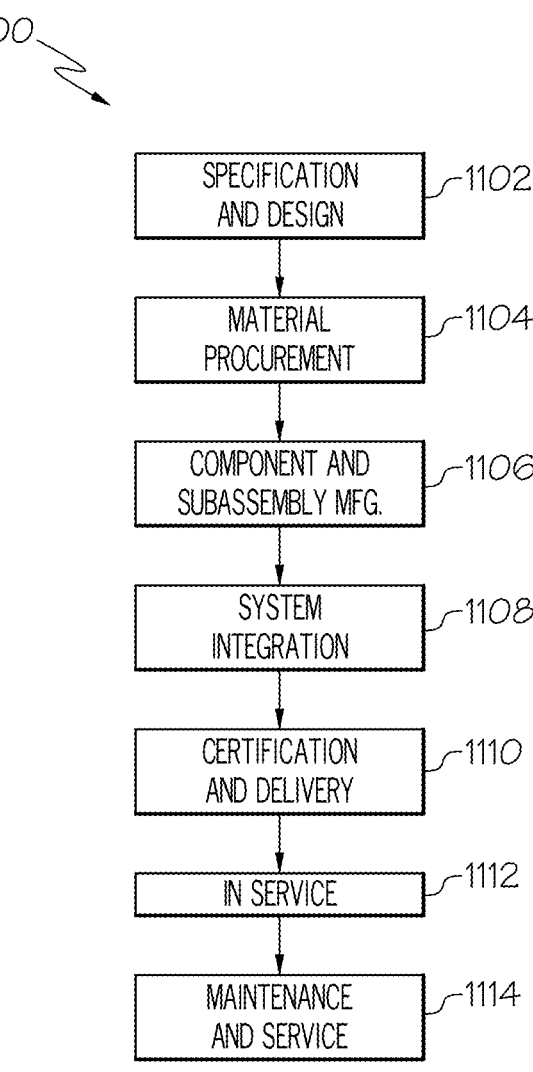
FIG. 10 is a flow diagram of an example of an aircraft manufacturing and service method.
Figure 11:
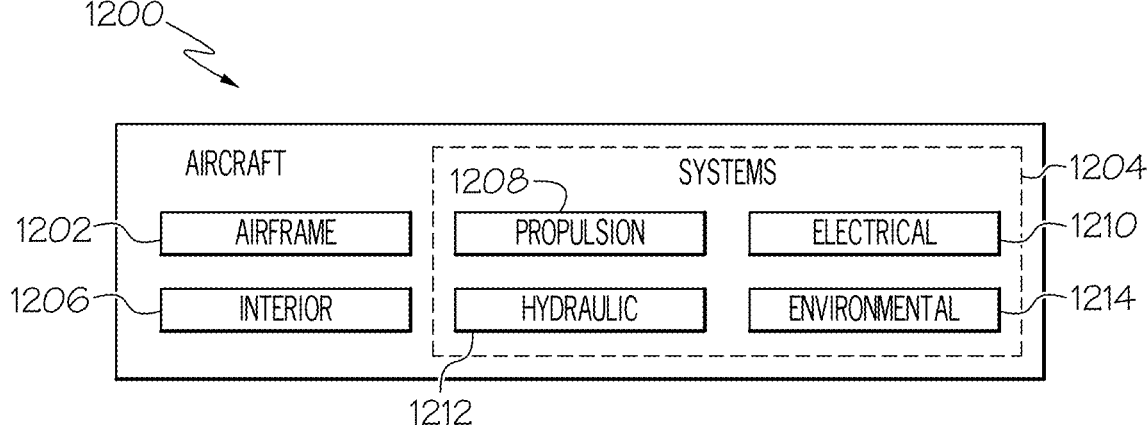
FIG. 11 is a schematic block diagram of an example of an aircraft.

Referring now to FIGS. 10 and 11, examples of the inspection system 100 and the inspection method 1000 described herein, may be related to, or used in the context of, an aircraft manufacturing and service method 1100, as shown in the flow diagram of FIG. 10 and an aircraft 1200, as schematically illustrated in FIG. 11. As an example, the aircraft 1200 and/or the aircraft production and service method 1100 may include one or more components having holes inspected and/or evaluated using the inspection system 100 and/or according to the inspection method 1000.

Referring to FIG. 10, which illustrates an example of the aircraft 1200. In one or more examples, the aircraft 1200 includes an airframe 1202 having an interior 1206. The aircraft 1200 includes a plurality of onboard systems 1204 (e.g., high-level systems). Examples of the onboard systems 1204 of the aircraft 1200 include propulsion systems 1208. Other examples of the onboard systems 1204 include hydraulic systems 1212, electrical systems 1210, and environmental systems 1214. In other examples, the onboard systems 1204 also includes one or more control systems coupled to an airframe 1202 of the aircraft 1200. In yet other examples, the onboard systems 1204 also include one or more other systems, such as, but not limited to, communications systems, avionics systems, software distribution systems, network communications systems, passenger information/entertainment systems, guidance systems, radar systems, weapons systems, and the like.

Referring to FIG. 10, during pre-production of the aircraft 1200, the manufacturing and service method 1100 includes specification and design of the aircraft 1200 (block 1102) and material procurement (block 1104). During production of the aircraft 1200, component and subassembly manufacturing (block 1106) and system integration (block 1108) of the aircraft 1200 take place. Thereafter, the aircraft 1200 goes through certification and delivery (block 1110) to be placed in service (block 1112). Routine maintenance and service (block 1114) includes modification, reconfiguration, refurbishment, etc. of one or more systems of the aircraft 1200.

Each of the processes of the manufacturing and service method 1100 illustrated in FIG. 10 may be performed or carried out by a system integrator, a third party, and/or an operator (e.g., a customer). For the purposes of this description, a system integrator may include, without limitation, any number of spacecraft manufacturers and major-system subcontractors; a third party may include, without limitation, any number of vendors, subcontractors, and suppliers; and an operator may be an airline, leasing company, military entity, service organization, and so on.

Examples of the inspection system 100 and the inspection method 1000, shown and described herein, may be employed during any one or more of the stages of the manufacturing and service method 1100 shown in the flow diagram illustrated by FIG. 10. In an example, holes inspected and/or evaluated using the inspection system 100 and/or according to the inspection method 1000 may form a portion of component and subassembly manufacturing (block 1106) and/or system integration (block 1108). Further, holes inspected and/or evaluated using the inspection system 100 and/or according to the inspection method 1000 may be implemented in a manner similar to components or subassemblies prepared while the aircraft 1200 is in service (block 1112). Also, holes inspected and/or evaluated using the inspection system 100 and/or according to the inspection method 1000 may be utilized during system integration (block 1108) and certification and delivery (block 1110). Similarly, holes inspected and/or evaluated using the inspection system 100 and/or according to the inspection method 1000 may be utilized, for example and without limitation, while the aircraft 1200 is in service (block 1112) and during maintenance and service (block 1114).

The preceding detailed description refers to the accompanying drawings, which illustrate specific examples described by the present disclosure. Other examples having different structures and operations do not depart from the scope of the present disclosure. Like reference numerals may refer to the same feature, element, or component in the different drawings. Throughout the present disclosure, any one of a plurality of items may be referred to individually as the item and a plurality of items may be referred to collectively as the items and may be referred to with like reference numerals. Moreover, as used herein, a feature, element, component, or step preceded with the word "a" or "an"

should be understood as not excluding a plurality of features, elements, components, or steps, unless such exclusion is explicitly recited.

Illustrative, non-exhaustive examples, which may be, but are not necessarily, claimed, of the subject matter according to the present disclosure are provided above. Reference herein to "example" means that one or more feature, structure, element, component, characteristic, and/or operational step described in connection with the example is included in at least one aspect, embodiment, and/or implementation of the subject matter according to the present disclosure. Thus, the phrases "an example," "another example," "one or more examples," and similar language throughout the present disclosure may, but do not necessarily, refer to the same example. Further, the subject matter characterizing any one example may, but does not necessarily, include the subject matter characterizing any other example. Moreover, the subject matter characterizing any one example may be, but is not necessarily, combined with the subject matter characterizing any other example.

As used herein, a system, apparatus, device, structure, article, element, component, or hardware "configured to" perform a specified function is indeed capable of performing the specified function without any alteration, rather than merely having potential to perform the specified function after further modification. In other words, the system, apparatus, device, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware that enable the system, apparatus, structure, article, element, component, or hardware to perform the specified function without further modification. For purposes of this disclosure, a system, apparatus, device, structure, article, element, component, or hardware described as being "configured to" perform a particular function may additionally or alternatively be described as being "adapted to" and/or as being "operative to" perform that function.

Unless otherwise indicated, the terms "first," "second," "third," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

As used herein, the phrase "at least one of", when used with a list of items, means different combinations of one or more of the listed items may be used and only one of each item in the list may be needed. For example, "at least one of item A, item B, and item C" may include, without limitation, item A or item A and item B. This example also may include item A, item B, and item C, or item B and item C. In other examples, "at least one of" may be, for example, without limitation, two of item A, one of item B, and ten of item C; four of item B and seven of item C; and other suitable combinations. As used herein, the term "and/or" and the "/" symbol includes any and all combinations of one or more of the associated listed items.

For the purpose of this disclosure, the terms "coupled," "coupling," and similar terms refer to two or more elements that are joined, linked, fastened, attached, connected, put in communication, or otherwise associated (e.g., mechanically, electrically, fluidly, optically, electromagnetically) with one another. In various examples, the elements may be associated directly or indirectly. As an example, element A may be directly associated with element B. As another example, element A may be indirectly associated with element B, for example, via another element C. It will be understood that not all associations among the various disclosed elements are necessarily represented. Accordingly, couplings other than those depicted in the figures may also exist.

As used herein, the term "approximately" refers to or represents a condition that is close to, but not exactly, the stated condition that still performs the desired function or achieves the desired result. As an example, the term "approximately" refers to a condition that is within an acceptable predetermined tolerance or accuracy, such as to a condition that is within 10% of the stated condition. However, the term "approximately" does not exclude a condition that is exactly the stated condition. As used herein, the term "substantially" refers to a condition that is essentially the stated condition that performs the desired function or achieves the desired result.

FIGS. 1-8 and 11, referred to above, may represent functional elements, features, or components thereof and do not necessarily imply any particular structure. Accordingly, modifications, additions and/or omissions may be made to the illustrated structure. Additionally, those skilled in the art will appreciate that not all elements, features, and/or components described and illustrated in FIGS. 1-8 and 11, referred to above, need be included in every example and not all elements, features, and/or components described herein are necessarily depicted in each illustrative example. Accordingly, some of the elements, features, and/or components described and illustrated in FIGS. 1-8 and 11 may be combined in various ways without the need to include other features described and illustrated in FIGS. 1-8 and 11, other drawing figures, and/or the accompanying disclosure, even though such combination or combinations are not explicitly illustrated herein. Similarly, additional features not limited to the examples presented, may be combined with some or all of the features shown and described herein. Unless otherwise explicitly stated, the schematic illustrations of the examples depicted in FIGS. 1-8 and 11, referred to above, are not meant to imply structural limitations with respect to the illustrative example. Rather, although one illustrative structure is indicated, it is to be understood that the structure may be modified when appropriate. Accordingly, modifications, additions and/or omissions may be made to the illustrated structure. Furthermore, elements, features, and/or components that serve a similar, or at least substantially similar, purpose are labeled with like numbers in each of FIGS. 1-8 and 11, and such elements, features, and/or components may not be discussed in detail herein with reference to each of FIGS. 1-8 and 11. Similarly, all elements, features, and/or components may not be labeled in each of FIGS. 1-8 and 11, but reference numerals associated therewith may be utilized herein for consistency.

In FIGS. 9 and 10, referred to above, the blocks may represent operations, steps, and/or portions thereof and lines connecting the various blocks do not imply any particular order or dependency of the operations or portions thereof. It will be understood that not all dependencies among the various disclosed operations are necessarily represented. FIGS. 9 and 10 and the accompanying disclosure describing the operations of the disclosed methods set forth herein should not be interpreted as necessarily determining a sequence in which the operations are to be performed. Rather, although one illustrative order is indicated, it is to be understood that the sequence of the operations may be modified when appropriate. Accordingly, modifications, additions and/or omissions may be made to the operations illustrated and certain operations may be performed in a different order or simultaneously. Additionally, those skilled in the art will appreciate that not all operations described need be performed.

Further, references throughout the present specification to features, advantages, or similar language used herein do not imply that all of the features and advantages that may be realized with the examples disclosed herein should be, or are in, any single example. Rather, language referring to the features and advantages is understood to mean that a specific feature, advantage, or characteristic described in connection with an example is included in at least one example. Thus, discussion of features, advantages, and similar language used throughout the present disclosure may, but do not necessarily, refer to the same example.

The described features, advantages, and characteristics of one example may be combined in any suitable manner in one or more other examples. One skilled in the relevant art will recognize that the examples described herein may be practiced without one or more of the specific features or advantages of a particular example. In other instances, additional features and advantages may be recognized in certain examples that may not be present in all examples. Furthermore, although various examples of the inspection system 100 and the inspection method 1000, as well as various examples of the data processing system 300, the computer program product 322, and the computer-readable storage media 324 used to implement the inspection system 100 and/or the inspection method 1000, have been shown and described, modifications may occur to those skilled in the art upon reading the specification. The present application includes such modifications and is limited only by the scope of the claims.

What is claimed is:

1. An inspection system comprising:

a scanner configured to scan an inner surface of a hole and to generate a plurality of images, wherein each one of the images represents one of a plurality of sections of the inner surface, and wherein at least a portion of the scanner is configured to be inserted into the hole; and a processor coupled to the scanner to receive the plurality of images, wherein the processor is programmed to:

determine a reflection angle of the scanner based on a known curvature of the inner surface;

combine the plurality of images to form an image that represents the inner surface of the hole;

determine pixel-intensity values of pixels of the image, wherein the pixel-intensity values represent optical reflectivity of the inner surface;

compensate for variations in the optical reflectivity of the inner surface due to a curvature of the inner surface by:

comparing the pixel-intensity values represented in the image to a reference-intensity value; and upscaling or downscaling one or more of the pixel-intensity values represented in the image based on the reference-intensity value and the reflection angle of the scanner and the inner surface of the hole to generate compensated pixel-intensity values; and evaluate the inner surface to distinguish between coated surface area and uncoated surface area based on the compensated pixel-intensity values of the image by comparing the compensated pixel-intensity values to a threshold-intensity value, wherein the compensated pixel-intensity values represent the optical reflectivity of the inner surface compensated for variations due to the curvature.

2. The inspection system of claim 1, wherein the processor is further programmed to determine a presence of a surface coating based on the comparison of the compensated pixel-intensity values to the threshold-intensity value.

3. The inspection system of claim 2, wherein the processor is further programmed to determine a percentage of the inner surface that comprises the surface coating.

4. The inspection system of claim 1, wherein the processor is further programmed to segment the image into a plurality of image segments based on similarities of the compensated pixel-intensity values of pixels in a region of the image.

5. The inspection system of claim 1, wherein the processor is further programmed to flatten the image.

6. The inspection system of claim 1, wherein the scanner comprises an endoscopic scanner that is configured to be inserted within the hole.

7. The inspection system of claim 1, wherein the scanner comprises a structured light scanner.

8. The inspection system of claim 1, wherein the processor is further programmed to quantify surface coverage represented by a ratio of the coated surface area to the uncoated surface area.

9. The inspection system of claim 2, wherein the processor is further programmed to qualify the inner surface based on the presence of the surface coating.

10. An inspection method comprising:

capturing a plurality of images of an inner surface of a hole;

combining the images to form an image that represents the inner surface of the hole;

determining pixel-intensity values of pixels of the image, wherein the pixel-intensity values represent optical reflectivity of the inner surface;

compensating for variations in the optical reflectivity of the inner surface due to a curvature of the inner surface by:

comparing the pixel-intensity values represented in the image to a reference-intensity value; and upscaling or downscaling one or more of the pixel-intensity values represented in the image based on the reference-intensity value and a reflection angle of the scanner and the inner surface of the hole to generate compensated pixel-intensity values; and evaluating the inner surface to distinguish between coated surface areas and uncoated surface areas based on the compensated pixel-intensity values of the image by comparing the compensated pixel-intensity values to a threshold-intensity value, wherein the compensated pixel-intensity values represent the optical reflectivity of the inner surface compensated for variations due to the curvature.

11. The inspection method of claim 10, wherein evaluating the inner surface further comprises determining a presence of a surface coating based on a comparison of the compensated pixel-intensity values to the threshold-intensity value.

12. The inspection method of claim 11, further comprising determining a percentage of the inner surface that comprises the surface coating.

13. The inspection method of claim 10, further comprising segmenting the image into a plurality of image segments based on similarities of the pixel-intensity values of pixels in a region of the image.

14. The inspection method of claim 11, wherein evaluating the inner surface further comprises qualifying the inner surface based on the presence of the surface coating.

15. The inspection method of claim 11, wherein evaluating the inner surface further comprises quantifying surface coverage represented by a ratio of the coated surface area to the uncoated surface area.

16. A data processing system comprising:

a processor; and a memory storing program code that, when executed by the processor, causes the processor to:

receive a plurality of images that represent a plurality of sections of an inner surface of a hole in an object;

determine a reflection angle of the scanner based on a known curvature of the inner surface;

combine the images to form an image that represents the inner surface of the hole;

determine pixel-intensity values of pixels of the image, wherein the pixel-intensity values represent optical reflectivity of the inner surface;

compensate for variations in the optical reflectivity of the inner surface due to a curvature of the inner surface by:

comparing the pixel-intensity values represented in the image to a reference-intensity value; and upscaling or downscaling one or more of the pixel-intensity values represented in the image based on the reference-intensity value and the reflection angle of the scanner and the inner surface of the hole to generate compensated pixel-intensity values; and evaluate the inner surface to distinguish between coated surface areas and uncoated surface areas based on the compensated pixel-intensity values of the image by comparing the compensated pixel-intensity values to a threshold-intensity value, wherein the compensated pixel-intensity values represent the optical reflectivity of the inner surface compensated for variations due to the curvature.

17. The data processing system of claim 16, wherein:

the program code, when executed by the processor, further causes the processor to determine a presence of a surface coating based on the comparison of the pixel-intensity values to the threshold-intensity value.

18. The data processing system of claim 16, wherein the program code, when executed by the processor, further causes the processor to segment the image into a plurality of image segments based on similarities of the compensated pixel-intensity values of pixels in a region of the image.

19. The data processing system of claim 17, wherein the program code, when executed by the processor, further causes the processor to qualify the inner surface based on the presence of the surface coating.

20. The data processing system of claim 17, wherein the program code, when executed by the processor, further causes the processor to quantify surface coverage represented by a ratio of the coated surface area to the uncoated surface area.

* * * * *